March 20, 1962  J. R. OISHEI ET AL  3,025,551
WINDSHIELD CLEANING SYSTEM
Filed Oct. 27, 1958  5 Sheets-Sheet 1

INVENTOR.
JOHN R. OISHEI
BY and WILLIAM C. RIESTER
Bean Brooks Buckley + Bean
ATTORNEYS March 20, 1962  J. R. OISHEI ET AL  3,025,551
WINDSHIELD CLEANING SYSTEM
Filed Oct. 27, 1958  5 Sheets-Sheet 2

INVENTOR.
JOHN R. OISHEI
BY and WILLIAM C. RIESTER
Bean Brooks Buckley & Bean
ATTORNEYS.

March 20, 1962 J. R. OISHEI ET AL 3,025,551
WINDSHIELD CLEANING SYSTEM
Filed Oct. 27, 1958 5 Sheets-Sheet 3

INVENTOR.
JOHN R. OISHEI
BY and WILLIAM C. RIESTER

Bean Brooks Buckley + Bean
ATTORNEYS

March 20, 1962 J. R. OISHEI ET AL 3,025,551
WINDSHIELD CLEANING SYSTEM
Filed Oct. 27, 1958 5 Sheets-Sheet 5

INVENTOR.
JOHN R. OISHEI
BY and WILLIAM C. RIESTER
Bean Brooks Buckley & Bean
ATTORNEYS

United States Patent Office 3,025,551
Patented Mar. 20, 1962

3,025,551
WINDSHIELD CLEANING SYSTEM
John R. Oishei, Buffalo, and William C. Riester, Williamsville, N.Y., assignors to Trico Products Corporation, Buffalo, N.Y.
Filed Oct. 27, 1958, Ser. No. 769,673
7 Claims. (Cl. 15—250.02)

This invention relates to windshield cleaning apparatus and more particularly to an improvement in the type of system wherein windshield wipers spread a solvent across a windshield to effect a cleaning operation.

It is one object of the present invention to provide a windshield washing system including a solvent pump which is automatically charged with a supply of solvent in response to the normal operation of a part of the vehicle, thereby preparing the washing system for an instantaneous discharge of solvent onto the windshield when the control is actuated.

Another object of the present invention is to provide a power operated windshield washer system wherein a pump which contains a stored quantity of solvent can either selectively project this quantity of solvent onto a windshield or project any desired amount in excess thereof which may be required to remove tenacious foreign matter from the windshield, both types of solvent projection being obtained by a single manipulation on the part of the vehicle operator.

A further object of the present invention is to provide a power operated, self-contained, self-recharging coordinating windshield washer structure which is capable of being installed in any existing vehicle having a wiper system, said washer structure containing all of the necessary elements to not only cause instantaneous discharge of a measured charge of solvent onto the windshield as soon as the system is actuated or an amount in excess thereof for cleaning tenacious foreign matter, but also cause both actuation of the wiper motor in response to the operation of the solvent pump and the automatic shutting off of the wiper motor after the termination of solvent projection.

In accordance with a first embodiment of the present invention, a spring-powered pump arrangement instantly projects a stored quantity of solvent onto a vehicle windshield when a control is actuated. The wiper motor is automatically actuated in response to operation of the pump to cause the wipers to spread the projected solvent across the windshield to thereby effect a cleaning operation. An arrangement is provided within the system for maintaining the wipers in operation for a short period after the termination of the projecting of the solvent to wipe the windshield to a dry state. After the wipers have been automatically parked, the pump is caused to communicate with a source of fluid pressure, such as the engine intake manifold, and the fluid pressure causes a charge of solvent to be drawn into the pump in preparation for subsequent windshield cleaning operation. The pump then remains inactive until the above-mentioned control is again actuated, and the foregoing sequence of events is then repeated. The advantage of the foregoing arrangement, as applied to a vacuum operated system, is that the pump may be recharged automatically during periods of high manifold vacuum, thereby maintaining the system in a state wherein solvent may be instantaneously projected onto the windshield regardless of the degree of manifold vacuum existing in the system at the time that the washer operation is desired.

A second embodiment of the invention includes an arrangement wherein a pump, which is similar to that described above, is recharged by an operating part of the vehicle, which is independent of the windshield cleaning apparatus, during the time that the windshield wipers are drying the windshield after the projecting of the solvent has been terminated. In accordance with this arrangement, a momentary actuation of the washer control will provide a measured charge of solvent to the windshield, or the continuous actuation of the control will cause a substantially continuous projecting of solvent which is interrupted only by the relatively short time required for the pump to automatically recharge itself. The advantage of the selective prolonged washer operation is that the vehicle operator, with one manipulation, is assured of providing as much solvent to the windshield as he desires in order to remove tenacious foreign matter therefrom which cannot be removed with one charge of solvent. After the control has been released, the washer automatically terminates solvent projection, effects a dry wiping cycle whereby excess moisture is removed from the windshield, and thereafter initiates automatic parking of the wiper blades.

A third embodiment of the present invention is also disclosed which is entirely self-contained so that it may be installed in existing vehicles having only a windshield wiper system without any requirement for complex connections or coupling structure to effect coordinated operation of the windshield washer pump and the wiper motor. In addition to its being designed for projecting a semi-continuous stream of solvent onto the windshield, as described above relative to the second embodiment, it is also designed for installation with a very small amount of effort.

All of the embodiments of the present invention will be more fully understood when the following portions of the specification are read in conjunction with the accompanying drawings wherein.

Figures 1, 2, 3, 4:
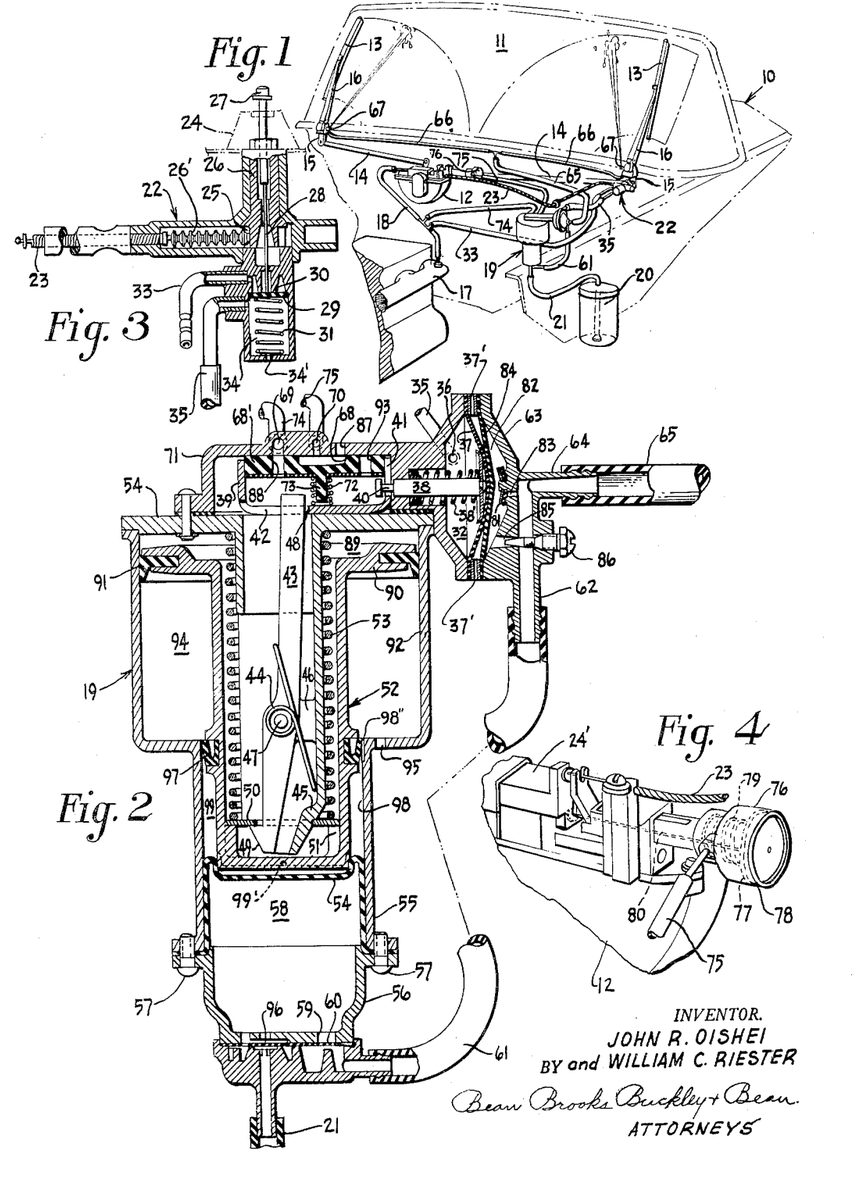
FIG. 1 is a fragmentary perspective view of a vehicle having one form of the improved cleaning arrangement of the present invention.
FIG. 2 is a view, partially in cross-section, of the improved solvent pump and timing unit of FIG. 1.
FIG. 3 is a detail view, partially in cross-section, of the control for initiating sole operation of the wiper system or joint operation with the washer system.
FIG. 4 is a fragmentary perspective detail view of a portion of a fluid pressure wiper motor.

In FIG. 1 a portion of an automotive vehicle 10 is shown having a windshield 11 thereon. The vehicle is also provided with a windshield wiper motor 12 for driving wiper blades 13 through links 14 and levers 15, which are rigidly secured to rockshafts (not shown) which mount wiper arms 16. The foregoing assembly operates in the conventional manner when suction is permitted to communicate from engine intake manifold 17 to motor 12 through conduit 18.

In accordance with one embodiment of the present invention, a windshield washing arrangement is provided which maintains a charge of cleaning solvent stored therein at all times when the cleaning system is not in operation to thereby assure prompt dispensing of solvent onto the windshield, when the washer is set into operation. The washing system includes a pump 19 (FIGS. 1 and 2) which is coupled to a solvent reservoir 20 by means of conduit 21. Mounted on the vehicle dashboard and operatively coupled to pump 19 is a control 22 (FIGS. 1 and 3), the latter also being coupled by Bowden wire unit 23 (FIGS. 1 and 4) to the slide valve 24′ of motor 12.

It will readily be appreciated that control 22 may be utilized to initiate operation of motor 12 independently of the washer system or may be utilized to initiate joint operation of both. When it is desired to merely set the wiper motor in operation, as is required during rainy weather, a knob 24 (FIG. 3) of control 22 is rotated. Knob 24 is rigidly secured at one end of hollow shaft 26 and pinion 25 is rigidly secured to the other end thereof. Pinion 25 is in mesh with rack 26′, which has the core of Bowden wire unit 23 secured thereto, the other end of the core being secured to slide valve 24′ of motor 12. It will thus be seen that the manipulation of knob 24 will result in the movement of slide valve 24′ to permit vacuum to communicate with motor 12 through conduit 18 and thereby set wiper motor 12 into operation, as is well known in the art.

When it is desired to effect a windshield cleaning operation which includes the projecting of solvent on the windshield and the spreading of this solvent by driving the windshield wipers, button 27 (FIG. 3) of control 22 is depressed. A shaft 28 extends between button 27 and a valve 29, which is normally biased to a closed position on seat 30 by spring 31. The unseating of valve 29 permits vacuum to communicate from manifold 17 to chamber 32 (FIG. 2) of pump 19 through conduit 18, conduit 33, chamber 34 of control 22, conduit 35, and aperture 36 in the wall of chamber 32. This action will result in the movement of diaphragm 37 to the left (FIG. 2) against the bias of spring 38′. The movement of diaphragm 37 to the left is accompanied by corresponding movement of shaft 38. The end of shaft 38 which is remote from diaphragm 37 is connected to a carriage or control 39 as by an undercut portion 40 of shaft 38 fitting within a slot 41 of the carriage. Thus, when diaphragm 37 and shaft 38 move to the left, carriage 39 will move to the left also.

Carriage or control 39 has a slot 42 in the lower portion thereof in which is positioned a trigger lever 43 which is normally biased to the position shown in FIG. 2 by torsion spring 44 which has one end bearing against trigger lever 43 and the other end bearing against plate 45 within the pump. The trigger 43 is pivotally mounted on arm 46, which extends from plate 45, by pin 47. When carriage 39 moves to the left from its position shown in FIG. 2, the end 48 of slot 42 causes trigger lever 43 to pivot in a counterclockwise direction about pin 47 against the bias of spring 44. This will cause the latching head 49 of trigger 43 to move away from washer 50 which is seated on shoulder 51 of piston assembly 52. The helical spring 53 which extends between pump cap 54 and washer 50, and which is in compression when the pump is in the position shown in the drawing, is thereby permitted to expand, thereby causing piston assembly 52 to move downwardly. This, in turn, causes the rolling wall 54 which is fastened between portions 55 and 56 of pump 19 by rivets 57, to move downwardly also and expel the charge of cleaning solvent in chamber 58 through orifice 59, and past flapper type check valve 60 into conduit 61 (FIGS. 1 and 2). Conduit 61 is in turn affixed to inlet nipple 62 of timing mechanism 63. The major portion of the solvent passes through nipple 62 and nipple 64 into conduit 65 (FIGS. 1 and 2), and then through conduits 66 to nozzles 67 adjacent to windshield 11, the nozzles projecting the solvent on to the windshield.

When carriage or control 39 moves to the left in FIG. 2 as described in detail above, the duct 68 in slide valve 68′, which is carried by carriage 39, will cause communication between aperture 69 and aperture 70 in pump head 71. In order to insure fluid tight contact between head 71 and slide valve 68′, a spring 72 is provided which encircles a projection 73 extending from the bottom of slide valve 68′, said spring extending between the slide valve and carriage 39 to bias the slide valve to an uppermost position in contact with head 71. Aperture 69 is in communication with conduit 74 which, in turn, is in communication with conduit 18 leading from engine intake manifold 17 (FIG. 1). Aperture 70 is in communication with conduit 75 (FIGS. 1 and 4) which leads to fluid pressure coupler 76 mounted on wiper motor 12. Thus, when slide valve 68′ causes communication between apertures 69 and 70 through conduit 68, there will be a communication of vacuum to fluid coupler 76. This, in turn, will cause a movement of piston 77 (FIG. 4) to the left in cylinder 78 against the bias of spring 79. A rod 80 has one end thereof connected to piston 77 and the other end thereof connected to slide valve 24′ of motor 12, and the above described action of coupler 76 will cause a movement of slide valve 24′ to a position wherein motor 12 will start to operate. The joint operation of motor 12 accompanying the projecting of solvent from nozzles 67 will thus be effected, and this joint operation will continue until such time as pump piston assembly 52 reaches its lowermost position wherein all of the solvent in chamber 58 is expelled.

It is desirable for the windshield wipers 13 to continue in operation for a short period after the projecting of solvent has been terminated in order to clear excess moisture from the windshield. To this end, a timing device 63 (FIG. 2), which is on pump 19, operates in the following manner: When solvent is first forced into conduits 61 and 65 in response to the release of trigger 43, there will be a pressure built up in these conduits because the apertures (not shown) in nozzles 67 cannot release the cleaning solvent as fast as it is forced into these conduits by piston 52. This will cause flapper valve 81 in chamber 82 to open and thereby permit solvent to enter this chamber through conduit 83. The fluid pressure, in turn, will cause diaphragm 84, which forms one wall of chamber 82, to be distended to the left. However, when the fluid pressure in conduits 61 and 65 is no longer present, spring 38′ will tend to push diaphragm 37 against diaphragm 84 to cause the solvent trapped in chamber 82 to be expelled through metering aperture 85. However, this solvent is expelled at a relatively slow controlled rate, depending on the adjustment of metering pin 86 which adjusts the size of aperture 85. Thus, spring 38 moves slide valve 68′ back to its position shown in FIG. 2 at a rate which is controlled by the time required for fluid to be expelled from chamber 82. This permits the wiper motor to operate after the projecting of solvent through nozzle 67 has terminated to insure that the windshield wipers will wipe the windshield dry of moisture.

It will be appreciated that the above-described depressing of button 27 is momentary, and that after button 27 is released, chamber 32 is in communication with the atmosphere through conduit 35 (FIGS. 1 and 3), chamber 34 of control 22, and venting aperture 34'. However, the movement of diaphragm 37 back to the position shown in FIG. 2 is controlled by the rate of metering of solvent from chamber 82, as described above. It is to be noted that vents 37' are provided in the housing of timing mechanism 63. These vents permit the atmosphere to communicate with the chamber between diaphragms 37 and 84 to permit diaphragm 37 to move instantaneously when chamber 32 is evacuated. If vents 37' were not present, diaphragm 84 would tend to follow diaphragm 37, and the inducing of a vacuum in chamber 82 by the movement of diaphragm 84 would impede instantaneous movement of diaphragm 37 thereby requiring that button 27 be depressed for a relatively long time.

The movement of slide valve 68' to its position shown in FIG. 2 will determine the completion of the dry wiping cycle described above, it being understood that mechanism (not shown) within wiper motor 12 will cause wiper blades 13 to be parked, as is well understood in the art. The movement of slide valve 24' on motor 12 to the position which will effect parking, occurs when slide valve 68' of pump 19 returns to the position shown in the drawing, because at this time conduit 75 (FIG. 4) leading to fluid coupler 76 will be vented to the atmosphere through aperture 70, conduit 68 in slide valve 68', and venting aperture 87 in pump head 71. This will permit spring 79 in coupler 76 to expand to thereby return piston 77 back to the position shown in FIG. 4 with the corresponding movement of slide valve 24' to the motor parking position.

When slide valve 68' is in the position shown in FIG. 2, chamber 89 of pump 19 is in communication with the engine intake manifold 17 through conduit 74, aperture 69, and conduit 88 in slide valve 68'. When the engine suction is of a sufficient magnitude, piston 90 will be caused to move upwardly because chamber 89 will be evacuated, piston 90 being provided with a seal 91 for providing fluid tight sealing contact between piston 90 and the inside wall 92 of chamber 89. The upward movement of piston 90 will result in the corresponding upward movement of piston assembly 52 and compress spring 53. This upward movement is continued until such time as latch-head 49 of trigger lever 43 engages the underside of washer 50 thereby locking piston assembly 52 in the position shown in FIG. 2 until such time as the actuation of control button 27 results in the release of trigger 43, as described above.

It will be appreciated that when slide valve 68' is moved to the left as described above to effect a discharge of solvent from chamber 58, conduit 88 in slide valve 68' moves out of communication with aperture 69 in valve head 71 to thereby prevent the vacuum in engine intake manifold 17 from preventing piston 52 from moving downwardly under the force of spring 53. Subsequent to the breaking of the foregoing communication, conduit 93 in slide valve 68' will align with venting aperture 87 in pump head 71 to permit chamber 89 to communicate with the atmosphere to thereby permit spring 53 to move piston assembly 52 downwardly without interference from any suction created by this movement. It will also be noted that chamber 94 below piston 90 is vented as at 95 to enhance free movement of the piston assembly.

When piston assembly 52 moves upwardly under the influence of suction on piston 90, as described above, one way flapper valve 96 at the bottom of chamber 58 will open to permit another charge of solvent to be drawn from reservoir 20 (FIG. 1) through conduit 21 to thereby place pump 19 in condition for a subsequent washing operation, as described in detail above.

It will also be noted that when piston assembly 52 moves upwardly, the seal 97 between it and the inside wall 98 of the pump tends to produce a vacuum in chamber 99. This, in turn, causes the rolling wall 54, which defines one side of the water chamber 58, to move upwardly to the position shown in FIG. 2 to thereby charge chamber 58 with solvent from reservoir 20. However, when seal 97, during its upward movement, reaches cut-away portion 98" of wall 98, the inducing of vacuum in chamber 99 is terminated, and this chamber is vented to the atmosphere through cut-away 98" and vent 95. The venting in combination with the feature that the bottom of piston assembly 52 does not bear on flexible wall 54 when piston assembly 32 is in its uppermost position prevents flexible wall 54 from moving in response to the slight up and down movement of piston assembly 52 which is induced by fluctuations in manifold vacuum. Furthermore, a slot 99' is provided on the bottom surface of piston assembly 52 to prevent the trapping of an air chamber between it and the upper surface of wall 54. Because of the foregoing construction wall 54 remains stationary regardless of movement of piston assembly 52, and the possibility of producing small solvent squirts from the nozzle when the washer is not in operation is obviated.

It will thus be seen that the foregoing embodiment provides a windshield cleaning arrangement wherein a supply of solvent may be provided to a vehicle windshield irrespective of the amount of vacuum existing in the engine intake manifold at the time washing of the windshield is desired.

Figure 5:
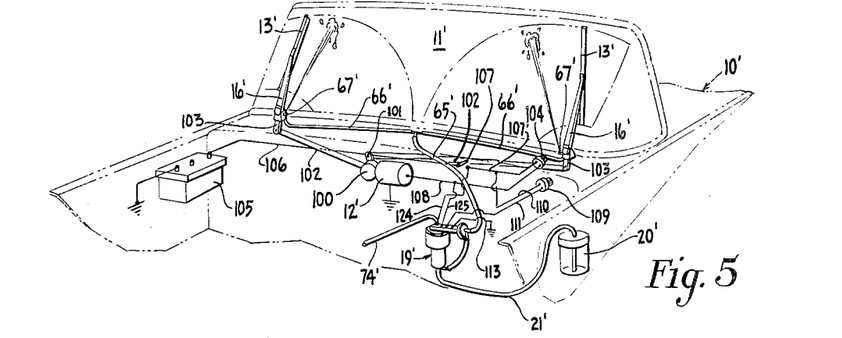
FIG. 5 is a fragmentary perspective view of a vehicle having a system such as depicted in FIGS. 1–4, but which is adapted to operate with an electric motor operated wiper.
Figure 6:
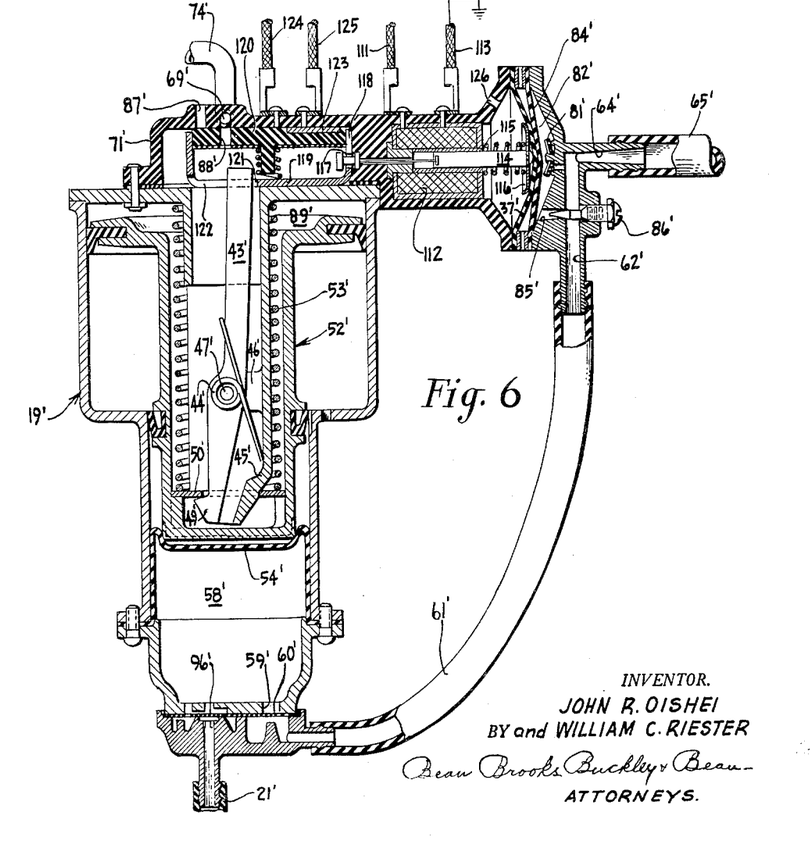
FIG. 6 is a view, partially in cross-section, of the pump unit which may be utilized with the system of FIG. 5.

FIGS. 5 and 6 disclose an alternate embodiment of the invention described above with respect to FIGS. 1–4. This embodiment is different in that the system is electro-pneumatic rather than solely pneumatic, and that it is utilized in conjunction with an electric windshield wiping motor. Certain of the basic elements of the system depicted in FIGS. 5 and 6 are identical to those disclosed above relative to FIGS. 1–4. Therefore, for the sake of brevity, only certain of the above discussed structural elements will be treated, it being understood that those not treated operate in the same manner described above.

In FIG. 5, a portion of an automotive vehicle 10' is shown having a windshield 11'. The vehicle is also provided with an electric windshield wiper motor 12' having a conventional gear reducer 100 suitably coupled thereto. Gear reducer 100 is coupled through link 101, links 102 and links 103 to rockshafts (not shown) on which are mounted wiper arms 16' which mount wipers 13'. The foregoing wiper arrangement operates in the conventional manner when single pole-single throw switch 104, which is mounted on the vehicle dashboard, is closed to permit electric current to flow from battery 105 through lead 106, closed ignition switch 107, switch 104, lead 108 and electric motor 12' to ground.

When it is desired to effect windshield cleaning by joint operation of the wipers spreading solvent across the windshield, single pole-single throw switch 109 is momentarily closed, this switch being normally spring-biased to an open position. This will cause current to flow from battery 105 through lead 106, ignition switch 107, lead 107', lead 110, switch 109, lead 111, solenoid 112 (FIG. 6), and lead 113 to ground. The momentary energization of solenoid 112 will cause armature 114 of solenoid 112 to move to the left in FIG. 6 against the bias of spring 115 which is interposed between plate 116 affixed to one end of armature 114 and the end of the solenoid. The end of armature 114 which is remote from the end mounting plate 116 has an undercut portion 117 which fits within a slot 118 in an end wall of movable carriage 119. The movement of armature 114 to the left will thus be accompanied by a corresponding movement of carriage 119. Mounted within carriage 119 is a combination slide valve and switch 120 which operates in a manner to be described hereafter.

When carriage 119 moves to the left the end 121 of slot 122 in carriage 119 will abut the upper end of trigger lever 43' which is pivotally mounted by pin 47' on arm 46' extending from wall 45' within pump unit 19'. A spring 44' normally biases trigger lever 43' to the position shown in FIG. 2. However, the movement of carriage 119 to the left will cause trigger lever 43′ to pivot in a counterclockwise direction about pin 47′ to thereby move latching head 49′ away from washer 50′. After latching head 49′ is thus released, helical spring 53′ (which is in compression when the parts are in the position shown in FIG. 6) may expand to thereby drive piston assembly 52′ downwardly. This downward movement of piston assembly 52′ will be accompanied by the movement of flexible wall 54′ of chamber 58′ to a position which approaches the bottom of the chamber. Thus, a charge of cleaning solvent within chamber 58′ will be expelled through orifice 59′ and past one-way flapper valve 60′ into conduit 61′. Continued downward movement of piston assembly 52′ will result in the solvent being forced through conduits 62′, 64′ and 65′ (FIGS. 5 and 6) to conduits 66′ which lead to solvent projecting nozzles 67′. In this manner a charge of cleaning solvent is supplied to windshield 11′.

Accompanying the release of trigger lever 43′, the movement of carriage 119 will cause conductor 123 mounted on element 120 to complete a circuit between electrical leads 124 and 125 (FIGS. 5 and 6). Thus an electrical path will be completed from battery 105 through lead 106, ignition switch 107, lead 124, conductor 123, lead 125, lead 108 and electric motor 12′ to ground to thereby cause the electric motor 12′ to drive the windshield wipers to spread the solvent across the windshield to effect a cleaning operation.

As mentioned above, it is only necessary to momentarily actuate switch 109 to initiate the windshield cleaning operation. However, once the operation of the system has been initiated, it continues to operate until the solvent projecting has terminated and the wipers have thereafter wiped the excess moisture from the windshield. To obtain these results, the following structure is utilized: A chamber 82′ is provided on the pump unit 19′ and one wall of this chamber consists of a flexible diaphragm 84′. As there is a build-up of pressure within the solvent conduits leading to the nozzles, as described above, flapper valve 81′ within chamber 82′ will be forced open and a charge of solvent which is admitted to chamber 82′ will force diaphragm 84′ to the left. After the solvent projecting has terminated, the biasing action of spring 115 on diaphragm 37′ will tend to force diaphragm 84′ back to the position shown in FIG. 6. However, a metering aperture 85′ is provided, and the rate of solvent flow from chamber 82′ can be preset by proper adjustment of metering pin 86′ which coacts with aperture 85′. Thus, the presence of solvent within chamber 82′ will cause carriage 119 to move to the right at a controlled rate under the urging of spring 115. As carriage 119 moves to the right, it will reach a point where conductor 123 loses contact with leads 124 and 125. Thereafter, conventional parking mechanism, not shown, will cause the motor to park the wipers. However, it will be understood that the wiper motor 12′ will continue in operation until such time as the charge of solvent from chamber 82′ is exhausted, this charge remaining in this chamber for a short period after solvent projection has terminated.

When carriage 119 returns to the position shown in FIG. 6, an aperture 88′ in slide valve 120 will become aligned with aperture 69′ which is in communication with conduit 74′ (FIGS. 5 and 6) leading from the engine intake manifold. The existence of a predetermined amount of vacuum within the engine intake manifold will, therefore, cause chamber 89′ of pump unit 19′ to be evacuated and thereby cause piston assembly 52′ to rise to its uppermost position shown in FIG. 6 from the lowermost position which it occupies at the end of a solvent dispensing cycle. As described above, relative to FIGS. 1–4, when piston assembly 52′ reaches its uppermost position, latching head 49′ of trigger lever 43′ will retain it in this position until such time as a windshield cleaning operation is again initiated. In moving upwardly, piston assembly 52′ causes flexible wall 54′ to return to the position shown in FIG. 6 and thereby cause one way flapper valve 96′ to open to admit a charge of cleaning solvent from reservoir 20′ and conduit 21′ into chamber 58′.

It will be noted that an atmospheric vent 87′ is provided in pump head 71′. This vent registers with conduit 88′ of slider valve 120 when the latter is in a solvent dispensing position. This permits the atmosphere to communicate with chamber 89′ to permit piston assembly 52′ to move freely. However, vent 87′ is not in communication with chamber 89′ when conduit 88′ permits the intake manifold to communicate with chamber 89′. It will also be noted that an atmospheric vent 126 is provided for the chamber housing spring 115 to permit free movement of diaphragm 37′ in response to the forces exerted thereon.

In FIGS. 7–13 inclusive, a further embodiment of the present invention is shown wherein a semi-continuous flow of solvent to the windshield for any desired time may be effected in order to clean tenacious foreign matter therefrom. This embodiment also possesses the other above noted features of the embodiment of FIGS. 1–4.

Figures 7, 9:
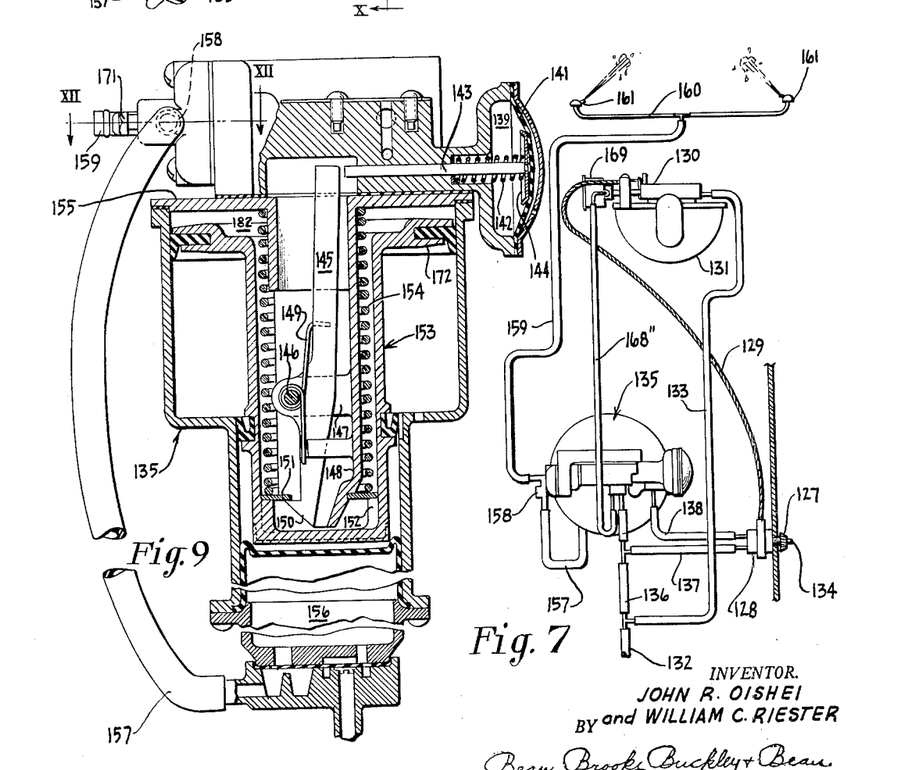
FIG. 7 is a schematic view of an alternate embodiment of the system depicted in FIGS. 1–6.
FIG. 9 is a view, taken generally along Line IX—IX of FIG. 8, certain portions of FIG. 8 being omitted and portions not being cross-sectioned.
Figure 8:
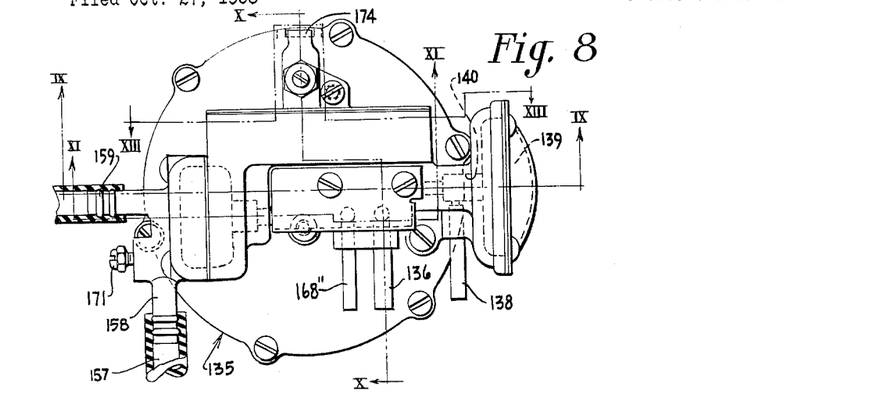
FIG. 8 is a plan view of a combination solvent pumping and timing unit of FIG. 7.

In FIG. 7 the entire system is schematically depicted. If it is desired to operate the windshield wipers independently of the washer system, it is merely necessary to manipulate knob 127 of control 128, which may be identical in construction to the control 22 of FIG. 3. Upon manipulation of knob 127, motion will be transmitted through Bowden wire unit 129 to slide valve assembly 130 of fluid pressure motor 131 to permit vacuum to communicate from a vacuum source (not shown) through conduits 132 and 133 to said motor for operation thereof in the conventional manner.

When it is desired to effect a windshield washing cycle, button 134 of control 128 is depressed to permit vacuum to communicate from the vacuum source (not shown) to the washer pump 135 through conduits 132, 136, 137, control 128 and conduit 138. From FIGS. 8 and 9 it can be seen that the foregoing action will cause chamber 139 to be evacuated into conduit 138 through conduit 140 of the pump assembly. The evacuation of chamber 139 will cause diaphragm 141 to move to the left in FIG. 9 against the bias of spring 142 and in turn cause shaft 143 to move to the left also, shaft 143 having an enlarged plate 144 affixed to the end thereof which is proximate diaphragm 141. The movement of shaft 143 to the left in FIG. 9 will cause the end thereof which is remote from plate 144 to abut trigger lever 145 which is pivotally mounted on pin 146 on arm 147 extending from wall 148 of the pump unit. Continued movement of shaft 143 will result in a counterclockwise pivotal movement of trigger lever 145 against the bias of spring 149. A point will be reached where latch head 150 of trigger lever 145 moves out of engagement with washer 151 which is mounted on seat 152 of piston assembly 153. After latch head 150 and washer 151 are disengaged, the compressed spring 154 which extends between the top 155 of the pump unit and the top of washer 151, will expand and therefore drive piston assembly 153 downwardly. This will cause the expelling of solvent from chamber 156 of the pump unit in the same manner described above, relative to FIGS. 1–6.

The expelled solvent will flow into conduit 157 (FIGS. 7, 9 and 12) and then through fitting 158 and conduits 159 and 160 to nozzles 161 (FIG. 7). As explained above relative to other embodiments of this invention, a build up of pressure in the conduits leading to the nozzles will result in the opening of flapper valve 162 (FIG. 12) to permit a portion of the high pressure solvent to enter chamber 163. This, in turn, will cause diaphragm 164 to move to the right in FIGS. 11 and 12 against the bias of spring 165. The movement of diaphragm 164 to the right is accompanied by a corresponding movement of shaft 166 to the right also, an enlarged plate 167 on shaft 166 being in engagement with diaphragm 164.

Figures 11, 12, 14:
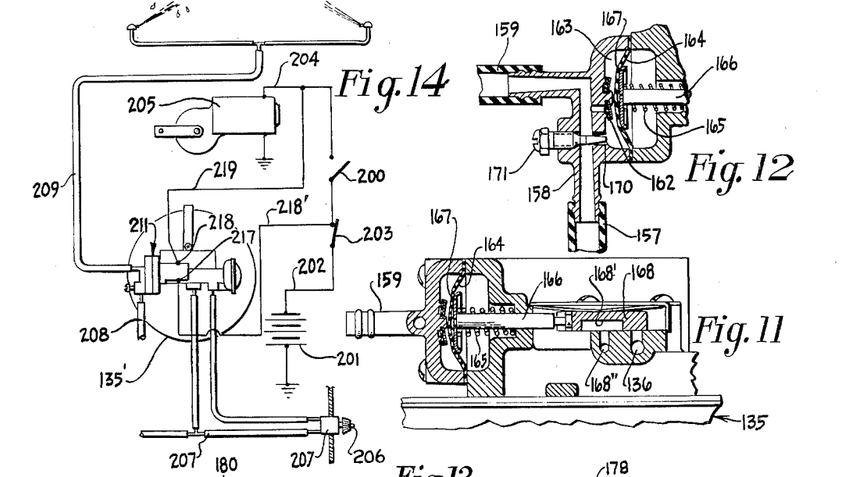
FIG. 11 is a view taken generally along Line XI—XI of FIG. 8.
FIG. 12 is a view taken along Line XII—XII of FIG. 9.

The end of shaft 166 which is remote from plate 167 is connected to a slide valve 168 (FIG. 11). After slide valve 168 has moved to the right (FIG. 11), conduit 168' therein, will cause communication between conduit 136 leading from the vacuum source (FIGS. 7 and 11) and conduit 168" leading to fluid pressure coupler 169 (FIG. 7) which is attached to the wiper motor 131. Fluid pressure coupler 169 may be identical in construction with fluid pressure coupler 76 shown in FIG. 4. As explained above, relative to FIG. 4, the effect of fluid pressure on coupler 169 will cause the slide valve assembly 130 to assume a position wherein fluid pressure motor 131 is energized to drive the windshield wiper. Thus, when the washer system is set in operation by the manipulation of button 134, there will be a corresponding automatic energization of the windshield wiper motor in the above described manner. It is to be noted, however, that the wiper motor will not operate unless solvent is projected onto the windshield. This action prevents the wipers from smearing dirt on the windshield when the solvent supply is exhausted.

Notwithstanding that button 134 is released immediately after it is actuated, spring 154 will continue to expel solvent from chamber 156 and the pressure of the solvent will cause slide valve 168 (FIG. 11) to maintain the wiper motor in operation during the solvent projecting period. After the piston assembly 153 reaches the bottom of its stroke, the flow of solvent to the windshield will terminate. However, solvent will be trapped in chamber 163 (FIG. 12), and the expansion of spring 165 will tend to force this fluid out of chamber 163 through aperture 170 at a controlled rate depending on the setting of metering pin 171, as described above relative to the analogous structure in the other embodiments.

However, when piston assembly 153 reaches the bottom of the stroke, the under side of piston 172 (FIG. 10) will engage the end 173 of link 174 and carry it downwardly, link 174 being guided for vertical movement relative to pump 135 by pin 175 which is mounted for sliding movement in a suitably packed aperture in the top 155 of the pump assembly. When link 174 moves downwardly, the forked upper end 176 thereof (FIGS. 10 and 13) will bear down on pin 177, which is attached to cam plate 178. Cam plate 178 is mounted for pivotal movement on pin 179 which is mounted on planar valve face 180 within the pump head structure. When link 174 moves downwardly a sufficient distance, pin 177 attached to cam plate 178 will be moved below pin 179. An over-center snap spring 181 having one end mounted on face 180 by pin 182 and the other end abutting pin 177 will cause cam plate 178 to snap in a clockwise direction. The lower surface 183 of cam plate 178 will strike kidney valve 184, which is mounted for pivotal movement on hollow bushing 185, and cause it to pivot in a clockwise direction. The clockwise movement of kidney valve 184 from its position shown in FIG. 13 will result in its covering aperture 186 (FIGS. 10 and 13), and the conduit within the kidney valve will cause communication between the vacuum source (not shown) and chamber 187 of the pump assembly 135 (FIG. 10) through conduit 136, conduit 188, hollow bushing 185, kidney valve 184, aperture 186, and conduit 189.

The foregoing occurs when piston assembly 153 is at the bottom of its stroke. Thus, the source of vacuum may communicate with chamber 187, that is, the chamber between the top of piston 172 and the top plate 155 of the pump assembly, while the windshield wiper motor 131 is still in operation. This will result in vacuum being supplied to chamber 187 to draw piston assembly 153 back to its uppermost position shown in FIGS. 9 and 10. When the piston assembly 153 reaches its uppermost position shown in these figures, piston 172 will abut the under side of pin 175 and thereby drive link 174 upwardly to cause the forked head 176 thereof to move back to the position shown in FIG. 13, the lower portion 190 of the forked head abutting pin 177 and causing a snap action of cam plate 178 which results in kidney 184 being moved off of aperture 186 to thereby disrupt communication between the source of vacuum and chamber 187.

Thus it will be appreciated that the upward movement of the piston assembly 153 will result in the recharging of chamber 156 of pump assembly 135 preparatory to a subsequent solvent dispensing cycle. All of the foregoing occurs while the wiper motor 131 remains in operation.

If the vehicle windshield has a slight amount of dirt thereon, the foregoing described cycle with one measured charge of solvent is sufficient to clean it, it being understood that when the supply of solvent is fully exhausted from chamber 163, slide valve 168 of the pump assembly will terminate communication between the vacuum coupler 169 (FIG. 7) and the source of vacuum to thereby cause fluid pressure motor 131 to park itself as described in detail above relative to the embodiment of FIGS. 1–4. On the other hand, there are frequently times when the vehicle windshield is covered with tenacious foreign matter such as splattered insects or a thick layer of other foreign matter which cannot be removed with one charge of solvent. Therefore, if the vehicle operator desires to continue projecting a supply of solvent on the windshield until such time as the foreign matter is completely cleared therefrom, he need merely maintain actuating button 134 (FIG. 7) continuously depressed. This will result in the semi-continuous discharge of fluid accomplished through the automatic action of the pump unit as described above. However, as noted above, the solvent recharging cycle will be effected while the windshield wiper motor is still in operation after the first charge of solvent has been exhausted from the pump chamber. When the chamber 156 is refilled as described above (while the wiper motor is still in operation) the maintaining of actuating button 134 in a depressed condition will result in the maintaining of shaft 143 (FIG. 9) in its position to the left whereby latching head 150 of trigger lever 145 cannot engage piston assembly 153. However, when piston 172 does reach its uppermost position, it will abut pin 175 to cause kidney valve 184 to switch over whereby chamber 187 of pump 135, which was previously under vacuum, is vented to the atmosphere whereby spring 154 may expand to expel solvent in chamber 156 in the above described manner. Thus, the continuous depressing of button 134 will result in the up and down movement of piston assembly 153 to provide a continuous charge of solvent to the windshield, this continuous charge being interrupted only by the length of time necessary to recharge pump chamber 156. When the foreign matter has been completely cleaned from the windshield, the button 134 may be released and the washer will automatically go through the balance of the washing cycle and a dry wipe cycle wherein excess moisture is cleared from the windshield. Thereafter, the automatic parking arrangement mentioned above will park the windshield wipers out of the vehicle operator's direction of vision.

It can thus be seen that the embodiment of FIGS. 7–13 inclusive discloses a windshield cleaning arrangement including a solvent dispensing pump which is selectively operable to provide either a measured predetermined quantity of solvent to the windshield or an amount of solvent in excess thereof which may be determined by the vehicle operator as conditions require.

Figures 10, 13, 15:
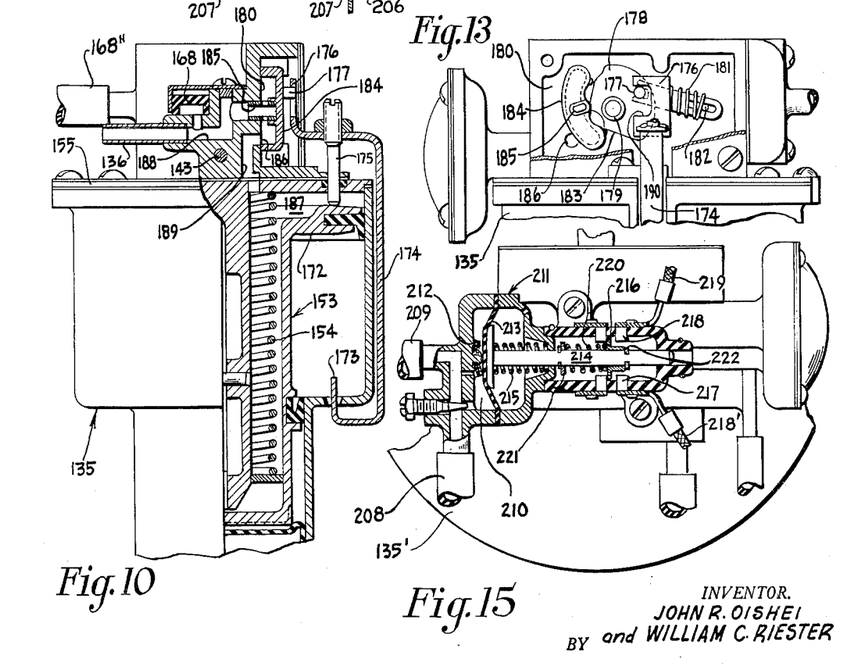
FIG. 10 is a view taken generally along Line X—X of FIG. 8.
FIG. 13 is a view taken generally along Line XIII—XIII of FIG. 8.
FIGS. 14 and 15 are views depicting an alternate embodiment of the invention of FIGS. 7–13, the alternate embodiments being adapted to operate with an electric motor.

In FIGS. 14 and 15 an embodiment of the invention of FIGS. 7–13 is disclosed for actuating an electric motor rather than a fluid pressure motor. The pump unit 135' is similar to pump unit 135 of FIGS. 7–13 except for the portion shown in cross-section in FIG. 15.

From the circuit shown in FIG. 14, it can be seen that if wiper motor operation is desired without the accompanying projecting of solvent onto the windshield, it is only necessary to close switch 200. When this is effected, a circuit is completed from battery 201 through lead 202, ignition switch 203, switch 200, lead 204, and electric motor 205 to ground, to cause oscillation of the windshield wipers.

If it is desired to cause coordinated operation of the wiper motor along with the projection of solvent from pump 135′ it is only necessary to depress button 206 of valve 207 to cause vacuum to communicate to the pump unit to release a trigger therein in the same manner described above relative to FIGS. 7–13. It will be understood that the fluid conduit aspects of switch 207 may be of the same construction as corresponding structure in switch 22 depicted in FIG. 4. Once the piston assembly (which may be identical to piston assembly 153) has been released, there will be a passage of solvent from the pump unit through conduits 208 and 209 to the windshield. A portion of this solvent will be forced into chamber 210 of coordinating unit 211 (FIG. 15), through one way valve 212. This will cause diaphragm 213 to move to the right and force shaft 214 to the right also against the bias of spring 215. Mounted on shaft 214 is a contactor 216 which engages contacts 217 and 218 after a slight amount of movement of shaft 214. Contactor 217 is electrically coupled to one terminal of ignition switch 203 by lead 218′, and contactor 216 is coupled to lead 204 by lead 219 (FIG. 14). It can thus be seen that as soon as shaft 214 has moved a slight amount to the right that a circuit will be completed from battery 201 to electric motor 205 to cause the windshield wiper motor to be placed in operation to accompany the projecting of solvent onto the windshield.

As the quantity of solvent continues to build up in chamber 210, shaft 214 will continue to move to the right. However, this additional movement will be taken up by spring 220 surrounding shaft 214, spring 220 being interposed between contactor 216 and a shoulder member 221 mounted on shaft 214.

After the solvent projecting has been terminated, spring 215 will cause shaft 214 to move to the left. However, spring 220 will cause contactor 216 to remain in engagement with contacts 217 and 218 until such time as abutment 222 on shaft 214 engages the rear side of contactor 216 and moves it away from the contacts. This occurs after the solvent has been completely metered from chamber 210 in a manner analogous to that described above relative to chamber 139 of FIG. 9. The foregoing construction thus maintains the electric wiper motor 205 in operation for a predetermined time after the projecting of solvent on to the windshield has been terminated to thus provide a dry wipe cycle to clear the windshield of excess moisture. When contactor 216 moves away from contactors 217 and 218, the circuit to electric motor 205 is broken and a conventional wiper parking circuit associated with the electric motor is utilized to park the wipers.

It can readily be appreciated that the embodiment of FIGS. 14 and 15 may be utilized to supply a charge of a predetermined amount of solvent to the windshield. However, in the event that it is desired to maintain a semi-continuous flow of solvent to the windshield for a longer time, it is merely necessary to maintain button 206 depressed for as long as the projecting of solvent is desired. The structure within pump unit 135′, which is of the same nature as the structure described above relative to FIGS. 7–13, will cause the pump unit to continue the cycle of drawing solvent from a reservoir (not shown) and expelling it into the conduits leading to the windshield until such time as button 206 is released. It is not deemed necessary to repeat this detailed operation which has been described above relative to FIGS. 7–13.

Figures 16, 17, 18:
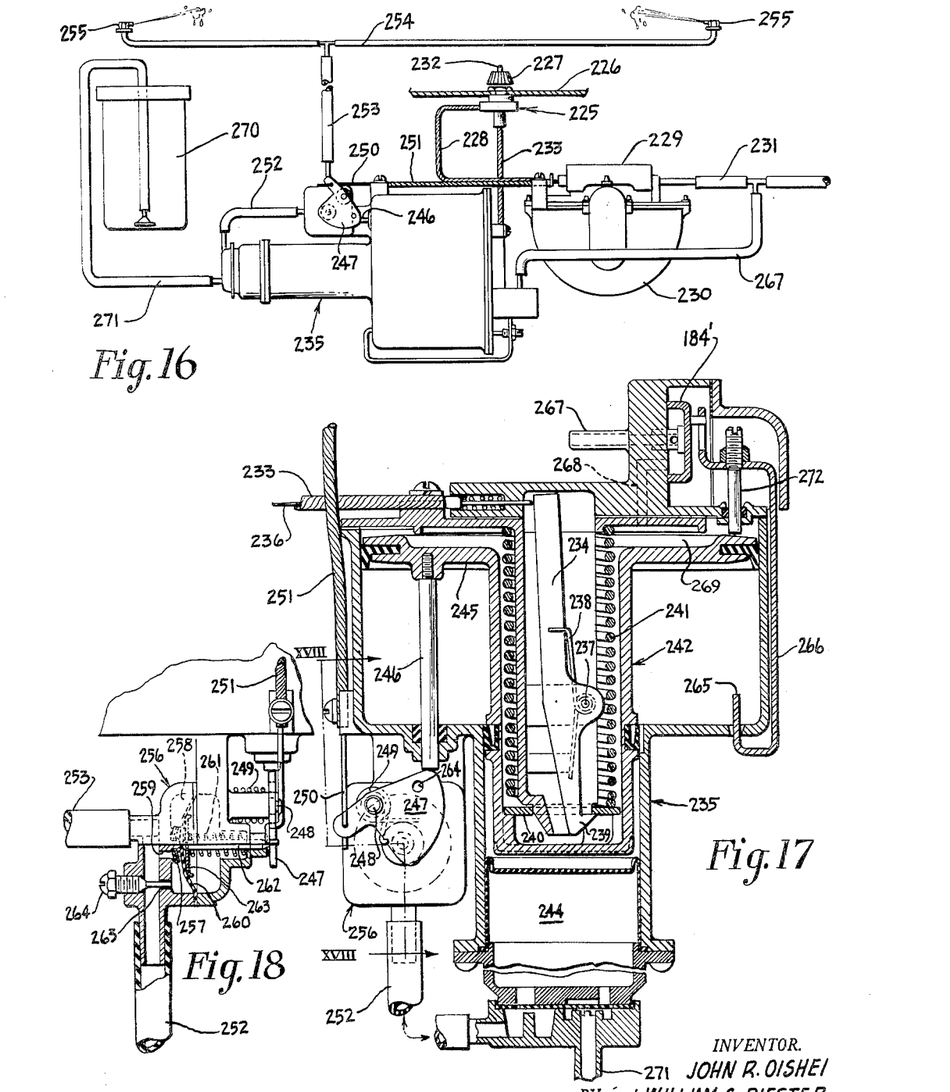
FIG. 16 is a view of a windshield cleaning system having a combination pump and timing unit which may be installed in an existing fluid pressure operated wiper system with a relatively small modification of the latter.
FIG. 17 is a cross-sectional view of the pump unit of FIG. 16.
FIG. 18 is a view, partially in cross-section, taken along Line XVIII—XVIII of FIG. 17.

In FIGS. 16, 17 and 18 a still further embodiment of the present invention is disclosed. In this embodiment a wholly self-contained pumping unit adapted to be used in conjunction with a fluid pressure motor obviates the necessity for requiring the wiper motor to have a pneumatic coupler attached thereto. The advantage of this construction is that the pump unit may be installed in a vehicle having a fluid pressure operated wiper motor to provide automatic coordinated action with a minimum of expense and installation effort.

In FIG. 16 a control 225 is shown mounted on the vehicle dashboard 226. If it is desired to merely set the wiper motor in operation to drive it independently of the solvent projecting apparatus, it is only necessary to manipulate knob 227, which, in turn, causes Bowden wire unit 228 to move slide valve assembly 229 so that fluid pressure may communicate with motor 230 from a fluid pressure source (not shown) through conduit 231. The internal mechanism in control 225 which motivates Bowden wire unit 228 may be a rack and pinion arrangement such as disclosed in FIG. 4.

If it is desired to effect a windshield cleaning operation by utilization of the windshield wipers spreading a projected solvent across the windshield, it is only necessary to momentarily depress button 232 of control 225. This button is connected to the core within Bowden wire unit 233 (FIGS. 16 and 17) which has the end thereof remote from control 225 abutting trigger lever 234. The trigger lever 234 is, in turn, mounted within pump unit 235 in a manner similar to that described above relative to the other embodiments of the invention. In short, when core 236 of Bowden wire unit 233 is moved to the right in FIG. 17, trigger lever 234 will pivot about pin 237 against the bias of spring 238 to thereby cause latching head 239 to be moved out of engagement with washer 240 upon which helical spring 241 bears. After latching head 239 is moved away from washer 240, the piston assembly 242 will be caused to move downwardly in FIG. 17 to thereby expel solvent from chamber 244 as described in detail above relative to similar structure in the other embodiments of this invention.

Attached to the upper piston 245 of piston assembly 242 is one end of a rod 246. The other end of this rod abuts lever 247. It can readily be seen that as piston assembly 242 moves downwardly, rod 246 will cause lever 247 to pivot in a clockwise direction (FIG. 17) about pin 248 against the bias of torsion spring 249. The core 250 of Bowden wire unit 251 (FIGS. 16 and 17) has one end thereof coupled to lever 247 and the other end coupled to slide valve assembly 229. Thus it can readily be seen that as piston assembly 242 moves downwardly and causes a corresponding pivotal movement of lever 247, Bowden wire unit 251 will actuate the slide valve of motor 230 to place the windshield wipers in operation, it being understood that the projecting of solvent on to the windshield precedes the operation of the windshield wiper motor because solvent is caused to flow from pump chamber 244 through conduit 252 and conduit 253 to conduit 254 which leads to nozzles 255 before slide valve assembly 229 is actuated.

In FIG. 18 a timing construction 256 is shown for causing the widshield wiper motor to operate for a limited time after the projecting of solvent has terminated. As explained above relative to similar constructions, when there is a build up of solvent pressure within conduits 252 and 253, flapper valve 257 will open to permit solvent to enter chamber 258 through conduit 259. This will tend to force diaphragm 260 to the right against the bias of spring 261, which is accompanied by a corresponding tendency for movement of shaft 262, because the diaphragm abuts the plate 263 mounted on the end of shaft 262. However, the end of shaft 262 which is remote from plate 263 is held against axial movement because it abuts the rear of lever 247, and it is not until lever 247 (FIGS. 17 and 18) pivots to the point where aperture 264 therein aligns with shaft 262 that shaft 262 can move to the right. When this occurs, the pressure within the chamber 258 will cause diaphragm 260 to move to the right and shaft 262 will enter aperture 264 in lever 247, thereby locking the latter in a position wherein the Bowden wire unit 251 actuated by a lever 247 maintains the slide valve assembly 229 of motor 230 in an operative position. Lever 247 remains in this locked position until such time as the solvent flows from chamber 258 through metering aperture 263, the size of which is controlled by metering screw 264, as explained above in analogous embodiments.

However, while the fluid pressure within chamber 258 maintains the wiper motor 230 in operation, the movement of piston assembly 242 to its lowermost position will result in the abutting of piston 245 against the upper edge 265 of link 266, this lever being similar in construction and serving the same function as link 174 of FIG. 10. More specifically, as piston 245 moves downwardly, it will carry link 266 downwardly with it. This will result in the actuation of the kidney valve 184' to permit vacuum to communicate from the vacuum source (not shown) through conduit 267 (FIGS. 16 and 17) and conduit 268 to the chamber 269 above piston 245. The structure and mode of operation of the vacuum routing kidney 184' and associated structure may be identical to the construction described relative to FIGS. 7–13, and it is believed that a detailed repetition of this subject matter is unnecessary. It is only necessary to understand that when the chamber 269 again communicates with the source of vacuum, piston assembly 242 will be pulled to its uppermost position whereby solvent will be drawn from reservoir 270 (FIG. 16) into pump chamber 244 through conduit 271. It can further be understood that the valving structure for effecting an intake and discharge of solvent relative to chamber 244 may be identical to that described above relative to FIGS. 1–6.

As described above relative to analogous structure, when piston assembly 242 reaches its uppermost position, piston 245 will abut pin 272 and cause the kidney valve 184' to vent chamber 269 to the atmosphere. However, prior to this venting, latch head 239 engages washer 240 to hold piston assembly 242 in its fully retracted position preparatory to a subsequent solvent discharge operation.

The piston assembly 242 reaches its uppermost position before solvent is fully discharged from timing chamber 258. This results in the continuing of operation of wiper motor 230 during the solvent recharging cycle. After the solvent is fully discharged from chamber 258 through metering aperture 263 because of the expansion of spring 261 which ultimately results in the movement of diaphragm 260 back to its position shown in FIG. 18, shaft 262 will be retracted from aperture 264 in lever 247. When this occurs, torsion spring 249 will result in pivoting lever 247 in a counterclockwise direction back to the position shown in FIG. 17 and thereby carrying core 250 of Bowden wire unit 251 back with it to actuate the slide valve assembly 229 of motor 230 to terminate wiper operation.

However, as noted above, relative to the embodiments of FIGS. 7–15, it is sometimes desirable to maintain the flow of solvent to the windshield for a period which is longer than that utilized in projecting of one charge of liquid. In this event, it is merely necessary to maintain control button 232 (FIG. 16) depressed or to depress it at any time after the cessation of the pump ejecting movement and before the parking of the wipers. Either of these actions prevents trigger lever 234 from engaging washer 240 at the top of the stroke of piston 242, whereby the piston will immediately start a downward movement to expel additional solvent from chamber 244 after chamber 244 is filled, this subsequent solvent projecting being initiated before timing chamber 258 is exhausted, that is, while the wiper motor is still in operation.

It can readily be seen that the embodiment of the invention disclosed in FIGS. 16–18 discloses a pump assembly 235 which may be incorporated into existing windshield wiper installations utilizing a vacuum motor without any requirement of any extensive modifications to the existing equipment, and with a minimum of effort.

While preferred embodiments of the present invention have been disclosed, it is to be understood that the present invention is not to be limited thereto, but may be otherwise embodied within the scope of the following claims.

What is claimed is:

1. A windshield cleaning system comprising a windshield wiper, motor means for driving said windshield wiper, and a self-contained coordinating solvent projecting arrangement comprising a pump adapted to store a measured quantity of solvent, first control means adapted to be actuated for causing said pump to project said solvent onto said windshield, second control means responsive to the operation of said pump for initiating operation of said motor means, third control means for causing a delay in the cessation of operation of said motor means after the termination of solvent projection, and fourth control means for causing recharging of said pump while said third control means are in operation, the maintaining of said first control means in a cleaner initiating condition while said third control means are in operation causing a continuous supply of solvent to be provided to said windshield, said continuous supply of solvent being interrupted only by the length of time necessary for said automatic recharging of said pump, the release of said first control means causing said pump to be automatically recharged and retained in a recharged condition until said first control means are again actuated.

2. A windshield washer system including a vacuum source and a washer pump and control means for effecting operation of said washer pump, said washer pump comprising a housing, a solvent chamber in said housing, piston means in said solvent chamber for effecting an intake and a discharge stroke, an intake conduit for conveying solvent to said solvent chamber during said intake stroke, a discharge conduit for conveying solvent from said solvent chamber during said discharge stroke, a vacuum chamber in said housing, first means operative at the terminal portion of a discharge stroke for causing said control means to be moved to a first position which permits said vacuum chamber to communicate with said source of vacuum to thereby cause said piston means to effect said intake stroke, spring means adapted to be compressed when said piston means are caused to effect said intake stroke, latch means for automatically latching said piston means in the position assumed thereby at the terminal portion of said intake stroke which is effected solely by said vacuum in said vacuum chamber whereby said spring means will remain compressed while said latch latches said piston means, second means for causing said control means to be moved to a second position wherein said vacuum chamber is no longer in communication with said source of vacuum and is vented, and means for unlatching said latching means while said second means causes said vacuum chamber to be vented to thereby permit said compressed spring means to expand and thereby effect the discharge stroke of said piston means.

3. A windshield cleaning system including both a windshield wiper system having a wiper with a motor operatively coupled thereto and a washer system; said washer system including a vacuum source and a washer pump and control means for effecting operation of said washer pump, said washer pump comprising a housing, a solvent chamber in said housing, piston means in said solvent chamber for effecting an intake and a discharge stroke, an intake conduit for conveying solvent to said solvent chamber during said intake stroke, a discharge conduit for conveying solvent from said solvent chamber during said discharge stroke, a vacuum chamber in said housing, first means operative at the terminal portion of a discharge stroke for causing said control means to be moved to a first position which permits said vacuum chamber to communicate with said source of vacuum to thereby cause said piston means to effect said intake stroke, spring means adapted to be compressed when said piston means are caused to effect said intake stroke, latch means for automatically latching said piston means in the position assumed thereby at the terminal portion of said intake stroke which is effected solely by said vacuum in said vacuum chamber whereby said spring means will remain compressed while said latch latches said piston means, second means for causing said control means to be moved to a second position wherein said vacuum chamber is no longer in communication with said source of vacuum and is vented, and means for unlatching said latching means while said second means causes said vacuum chamber to be vented to thereby permit said compressed spring means to expand and thereby effect the discharge stroke of said piston means; and means for causing said wiper motor to operate when said washer pump is placed in operation.

4. A windshield cleaning system comprising: a windshield wiper, a motor for driving said windshield wiper; a windshield washer system including a vacuum source and a washer pump and control means for effecting operation of said washer pump, said washer pump comprising a housing, a solvent chamber in said housing, piston means in said solvent chamber for effecting an intake and a discharge stroke, an intake conduit for conveying solvent to said solvent chamber during said intake stroke, a discharge conduit for conveying solvent from said solvent chamber during said discharge stroke, a vacuum chamber in said housing, first means operative at the terminal portion of a discharge stroke for causing said control means to be moved to a first position which permits said vacuum chamber to communicate with said source of vacuum to thereby cause said piston means to effect said intake stroke, spring means adapted to be compressed when said piston means are caused to effect said intake stroke, latch means for automatically latching said piston means in the position assumed thereby at the terminal portion of said intake stroke which is effected solely by said vacuum in said vacuum chamber whereby said spring means will remain compressed while said latch latches said piston means, second means for causing said control means to be moved to a second position wherein said vacuum chamber is no longer in communication with said source of vacuum and is vented, and means for unlatching said latching means while said second means causes said vacuum chamber to be vented to thereby permit said compressed spring means to expand and thereby effect the discharge stroke of said piston means; means for causing joint operation of said washer system and said wiper motor to thereby cause said wiper to clean a windshield; and means for causing said wiper motor to continue in operation after the termination of said discharge stroke to thereby dry moisture from said windshield.

5. A windshield washer system comprising a source of fluid pressure and a washer pump and control means actuable for effecting operation of said pump, said washer pump comprising a solvent chamber, an intake conduit for conveying solvent to said solvent chamber, a discharge conduit for conveying solvent from said solvent chamber, piston means mounted for reciprocation in said chamber for effecting an intake stroke and a discharge stroke, a fluid pressure chamber adapted to be subjected to fluid pressure from said source, means in said fluid pressure chamber to effect movement of said piston means in a first direction to effect one of said strokes when said fluid pressure chamber is subjected to fluid pressure, spring means for biasing said piston means in a second direction which is opposite to said first direction to thereby effect the other of said strokes, and valve means operable in synchronism with the movement of said piston means to place said fluid pressure chamber in communication with said fluid pressure source at the termination of movement of one of said strokes and for venting said fluid pressure chamber at the end of the other of said strokes to thereby cause said piston means to continuously alternately effect said intake and discharge strokes while said control means remain actuated.

6. A windshield washer system including a vacuum source and a washer pump and control means actuable for initiating operation of said washer pump, said washer pump comprising a housing, a solvent chamber in said housing, piston means in said solvent chamber for effecting an intake stroke and a discharge stroke, an intake conduit for conveying solvent to said solvent chamber during said intake stroke, a discharge conduit for conveying solvent from said solvent chamber during said discharge stroke, a vacuum chamber in said housing, first spring means for normally biasing said control means to a position wherein said vacuum chamber communicates with said vacuum source to thereby cause said piston means to effect said intake stroke, second spring means for biasing said piston means in a direction opposite to the direction of movement thereof effected as a result of the communication of said vacuum chamber with said source of vacuum, latch means for retaining said piston means in the position it assumes when said intake stroke is fully completed whereby said second spring means will remain compressed and whereby said piston means will not be moved under conditions where the vacuum at said source fluctuates, said control means including means for terminating said latching relationship of said piston means and for venting said vacuum chamber to thereby permit said compressed second spring means to expand and thereby effect the discharge stroke of said piston means, and means for retaining said control means in said venting position against the bias of said first spring means until the discharge stroke of said piston means is completed and thereafter permitting said first spring means to return said control means to a position wherein said venting of said vacuum chamber is terminated and wherein said vacuum chamber is again placed in communication with said vacuum source whereby the existence of vacuum at said vacuum source will move said piston means against the bias of said second spring means to thereby effect the intake stroke of said piston means, said latching means thereafter retaining said piston means in position wherein said pump is charged.

7. A windshield washer system including a vacuum source and a washer pump and control means actuable for initiating operation of said washer pump, said washer pump comprising a housing, a solvent chamber in said housing, piston means in said solvent chamber for effecting an intake stroke and a discharge stroke, an intake conduit for conveying solvent to said solvent chamber during said intake stroke, a discharge conduit for conveying solvent from said solvent chamber during said discharge stroke, a vacuum chamber in said housing, said control means being either in a first position for causing said vacuum chamber to communicate with said vacuum source or being in a second position for causing said vacuum chamber to be vented, first spring means operatively associated with said control means for biasing said control means to said second position after the intake stroke of said piston means has been completed, second spring means for biasing said piston means in a direction opposite to the direction of movement thereof effected as a result of the communication of said vacuum chamber with said source of vacuum, latch means for retaining said piston means in the position it assumes when said intake stroke is fully completed whereby said second spring means will remain compressed, said control means including means for terminating said latching relationship of said piston means to thereby permit said compressed second spring means to expand and thereby effect the discharge stroke of said piston means when said first spring means causes said control means to vent said vacuum chamber, and means for causing said control means to return to a position wherein said venting of said vacuum chamber is terminated and wherein said vacuum chamber is placed in communication with said vacuum source after the discharge stroke of said piston means is completed whereby the existence of vacuum at said vacuum source will move said piston means against the bias of said second spring means to thereby effect the intake stroke of said piston means, said latching means thereafter retaining said piston means in position wherein said pump is charged.

References Cited in the file of this patent

UNITED STATES PATENTS

| | | |
|---|---|---|
| 2,877,485 | Oishei | Mar. 17, 1959 |
| 2,882,545 | Kelley et al. | Apr. 21, 1959 |

FOREIGN PATENTS

| | | |
|---|---|---|
| 750,735 | Great Britain | June 20, 1956 |